United States Patent [19]

Ta et al.

[11] Patent Number: 4,755,836

[45] Date of Patent: Jul. 5, 1988

[54] PRINTHEAD CARTRIDGE AND CARRIAGE ASSEMBLY

[75] Inventors: Chuong C. Ta; Todd L. Russell, both of San Diego; Anthony W. Ebersole, Poway, all of Calif.

[73] Assignee: Hewlett-Packard Company, Palo Alto, Calif.

[21] Appl. No.: 47,075

[22] Filed: May 5, 1987

[51] Int. Cl.[4] .............................................. G01D 15/16

[52] U.S. Cl. ............................ 346/140 R; 346/139 R; 400/39; 400/126; 400/175; 400/713

[58] Field of Search ...................... 346/140, 75, 139 R; 400/126, 175, 59, 692, 713

[56] References Cited

U.S. PATENT DOCUMENTS

| | | | |
|---|---|---|---|
| 4,329,698 | 5/1982 | Smith | 346/140 |
| 4,500,894 | 2/1985 | Kirner | 346/140 |
| 4,500,895 | 2/1985 | Buck | 346/140 |
| 4,682,188 | 7/1987 | Castellano | 346/140 |

*Primary Examiner*—Joseph W. Hartary

[57] ABSTRACT

A printhead cartridge and carriage assembly (10) for use with ink-jet printers is disclosed. The assembly is provided with means (56) for ensuring that an ink-jet cartridge (20) is securely locked in place in a cartridge carrier (12), means (**78, 78*a*, 80, 80*a*, 82, 82*a*) for ensuring that cartridge is registered in a given, fixed, repeatable position each time, means (128) for ensuring that the cartridge is spaced from the printing medium (40) a minimum, fixed distance, means (100) on the carriage for maintaining this fixed distance, and interconnect means (84) for connecting a printhead assembly (34) on the cartridge with a microprocessor for controlling the pattern of ink drop ejection. The assembly further includes a preloader assembly (106) for preventing backward rotational pivoting of the carriage about a slider rod (44) associated with a platen (46) of the printer and for urging the carriage toward the medium on the platen. Finally, a dust barrier (132**) protects the interconnect means at the contact to the printhead assembly.

54 Claims, 6 Drawing Sheets

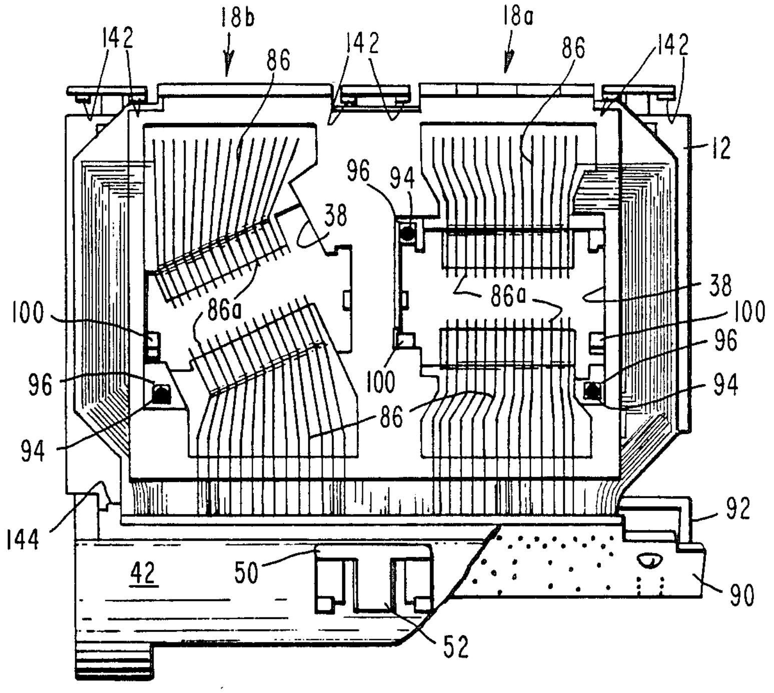
Fig. 8.
Fig. 16.
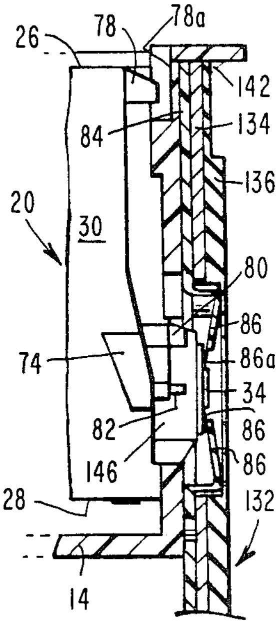
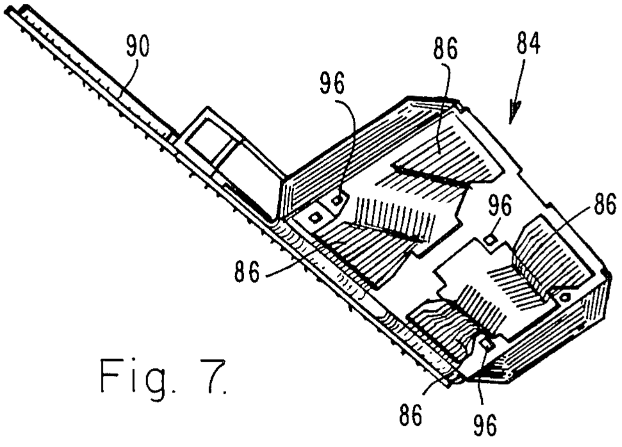
Fig. 7.

Fig. 9.
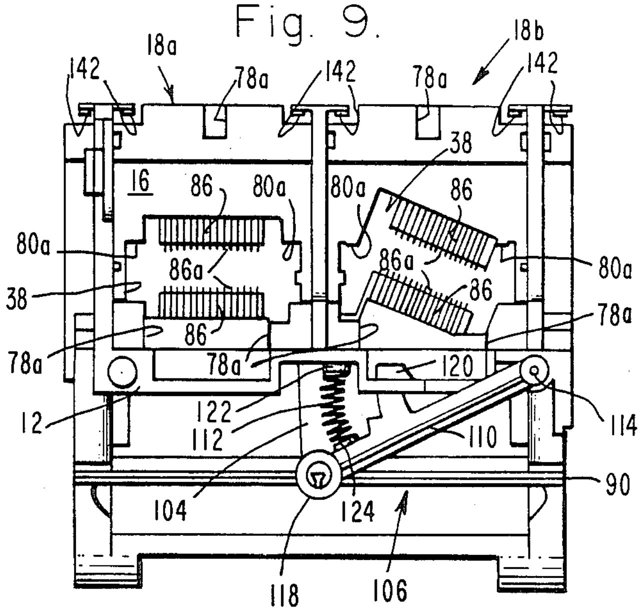
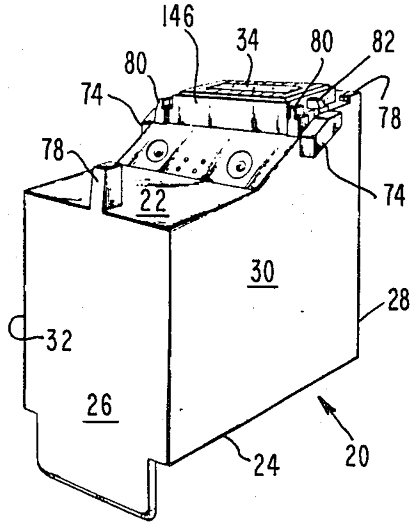
Fig. 10.
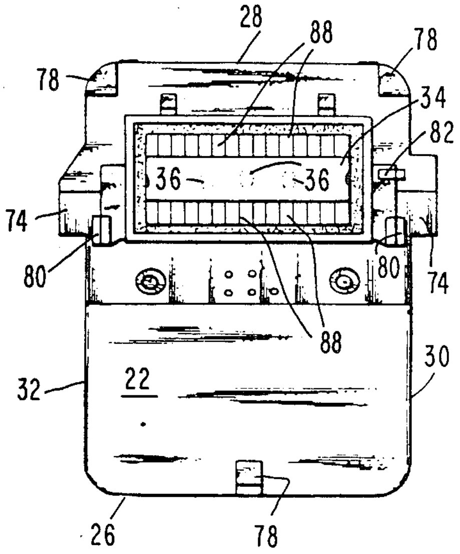
Fig. 11.

PRINTHEAD CARTRIDGE AND CARRIAGE ASSEMBLY

TECHNICAL FIELD

The present invention relates to ink-jet printers, and, more particularly, to a printhead cartridge and carriage assembly for use in such printers wherein the two major components are configured to cooperatively interact for accurate registration and positioning.

BACKGROUND ART

Improvements in the operation of ink-jet printers are constantly sought. Among such needed improvements are a means of ensuring that an ink-jet cartridge is securely locked in place in a cartridge carrier, that the cartridge is registered in a given, fixed, repeatable position each time, that the cartridge be spaced from the printing medium a minimum, fixed distance, that the carriage include means for maintaining this fixed distance, and that protected interconnect means be provided to connect the printhead mechanism on the cartridge with a microprocessor for controlling the pattern of ink drop ejection.

DISCLOSURE OF INVENTION

In accordance with the invention, a printhead cartridge and carriage assembly is provided for use with ink-jet printers. The assembly comprises:

(a) a carriage housing provided with a base and a face plate, and at least one station for cooperatively accepting a cartridge, one side of the cartridge being provided with a printhead assembly;

(b) a latch mechanism to securely lock the printhead cartridge in position in the station;

(c) means on both the printhead side of the cartridge and the inside of the face plate for registering the cartridge in a given, fixed, repeatable position;

(d) interconnect means on the face plate for electrically contacting the printhead assembly to permit control of the propulsion of droplets of ink from the cartridge toward a medium in a predetermined pattern to form images thereon;

(e) spacing means for permitting the printhead assembly to be spaced a minimum distance from the medium; and (f) a preloader assembly for preventing drop of the carriage housing from pivoting about a slider rod and for maintaining the printhead assembly at the minimum distance.

The face plate is provided with an opening associated with the station for permitting droplets of ink ejected from the cartridge to pass therethrough. The carriage housing is provided (a) with means for encompassing the slider rod, which is associated with a platen in the printer and (b) with means for attaching a portion of a belt also associated with the printer, so as to permit bidirectional movement along the slider rod in response to directed movement of the belt, thereby positioning the housing and the cartridge for printing on the medium supported on the platen.

For black and color printing, two stations, and thus two cartridges, are employed. One cartridge contains three colors (e.g., magenta, cyan, and yellow), each in a separate compartment, and the other cartridge contains black ink in a single compartment. In the latter cartridge, the printhead mechanism is rotated with respect to that of the former cartridge, permitting printing of the same line as the colored inks as well as the line above and the line below.

The latch mechanism is configured to repeatably position the cartridge against alignment features located in the carriage (on the inside of the face plate). By means of the latch, the cartridge is pulled into position and locked into place. The latch contacts the cartridge along two sculptured surfaces in such a way that loading is provided in all three coordinate axes.

The registration means comprises sets of protuberances, or lands, on the ink cartridge and a corresponding set of openings or surfaces in the face plate to accurately position the cartridge and prevent pitch, yaw and roll of the cartridge once it is locked into position.

A shim, spaced from the platen and co-axial therewith, and lands on the exterior of the face plate cooperate to maintain the printhead mechanism a minimum distance from the medium, which is moved along the surface of the platen, inside the shim. Such spacing minimizes distance variation to improve print quality and to reduce paper waviness. Use of a metal shim provides a ground path to the print medium.

A pre-loader roller arm on the back of the carriage housing keeps the printheads loaded against the shim with minimum friction during printing and also prevents the carriage housing from pivoting back away from the platen.

BRIEF DESCRIPTION OF THE DRAWINGS

FIG. 7 is a perspective view of a lead frame connected to a printed circuit board, the lead frame being used to interconnect the printhead mechanism on the cartridge with a microprocessor in the printer for control of the printing of images onto a medium;

FIG. 8 is a front elevational view of the interconnect portion of the lead frame and reference points in the face plate;

FIG. 9 is a rear elevational view of the carriage, without the cartridge present, showing the interconnect portion of the lead frame and a roller arm assembly;

FIG. 10 is a perspective view of a printhead cartridge used in conjunction with the carriage of the invention;

FIG. 11 is a front elevational view of the cartridge, showing the printhead assembly and reference lands thereon;

FIG. 16 is a view similar to that of FIG. 15, depicting the components in an assembled state.

BEST MODES FOR CARRYING OUT THE INVENTION

Figure 1:
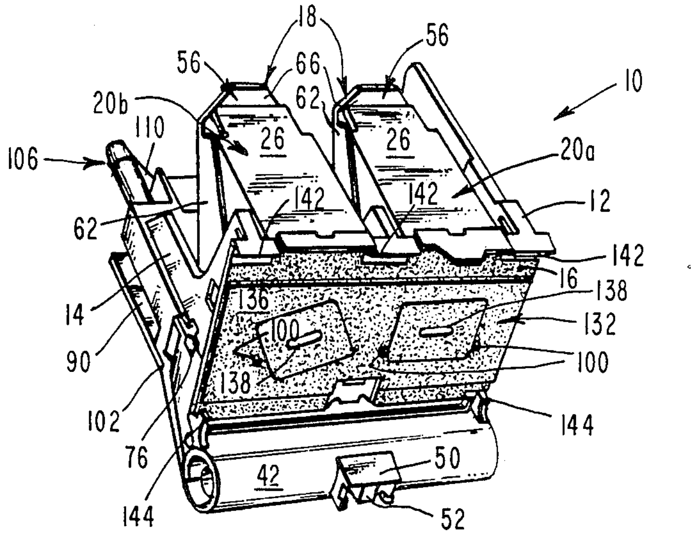
FIG. 1 is a perspective view of a printhead cartridge and carriage assembly, showing two printhead cartridges locked into place in the carriage by means of latching yokes.

Referring now to the drawings wherein like numerals designate like elements throughout, a printhead cartridge and carriage assembly is shown generally at 10. The assembly 10 comprises a carriage housing 12 having a base portion 14 and a face plate portion 16. The assembly 10 is intended for use in ink-jet printers, particularly is not depicted herein, elements common to such printers thermal ink-jet printers. While such a printer will be described in association with portions of the assembly 10.

The assembly 10 includes at least one station 18, and preferably two such stations 18*a*, 18*b*, as shown in the Figures. Each station 18 is adapted to cooperatively accept a printhead cartridge 20. The cartridge 20, shown more clearly in FIGS. 10 and 11, is defined by front 22, back 24, and top, bottom and side portions 26, 28, 30, 32, respectively. On the front of the cartridge 20 is provided a printhead mechanism 34, which is capable of ejecting droplets of ink in a predetermined pattern through a plurality of nozzles, forming a primitive 36. The printhead mechanism 34 may comprise any of those printhead mechanisms known in the art, and does not form a part of this invention.

The face plate portion 16 is provided with an opening 38 which is associated with a cartridge station 18. The opening 38, two of which are shown in the Figures, permits droplets of ink which are ejected from the cartridge 20 to pass therethrough. The droplets of ink are directed to a medium, the movement of which is shown by arrow 40 in FIG. 2. Media printed on by ink-jet printers may comprise materials such as paper, transparency film or other printable material, as is well-known. The droplets of ink form images on the medium, as directed by a microprocessor (not shown) in the printer. Such images may comprise alphanumeric characters, for example, or other images produced by a pattern of dots of ink.

Figure 3:
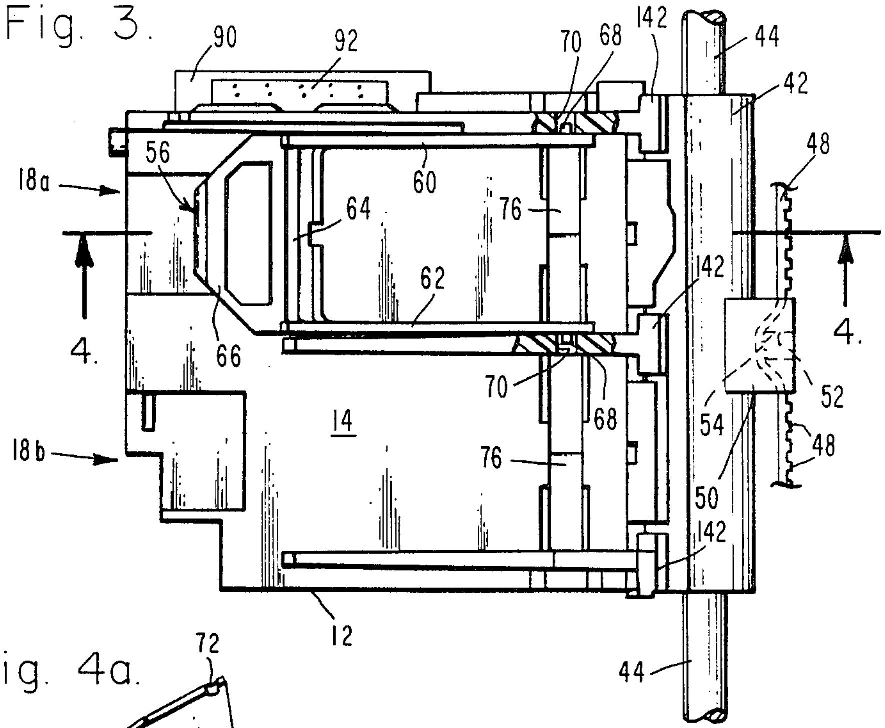
FIG. 3 is a top plan view and partial cross-section, showing the carriage in relation to components of the printer, including a slider rod and a drive belt.

The housing 12 is provided with means 42 for encompassing a slider rod 44 (FIG. 3) associated with the printer. The means 42 advantageously comprises a hollow cylinder, which accepts the slider rod 44 in reasonably snug, slidable fit.

The slider rod 44 is arranged parallel to a platen 46, against which the medium (shown by arrow 40) is urged. The assembly 10 is adapted to move bidirectionally on the slider rod 44 by means of a drive belt 48, which is driven by a motor (not shown) under the control of the microprocessor. By such control, the assembly 10 may be accurately positioned for printing onto the medium.

The belt 48 is attached to the assembly 10 by means of a housing 50 on the exterior of the hollow cylinder 42. One side of the belt 48 is provided with teeth 48*a*, and the housing 50 defines an interior U-shaped cut-out 52, in the bight of which is provided a set of teeth 54 for engaging the teeth of the belt.

Figure 4A:
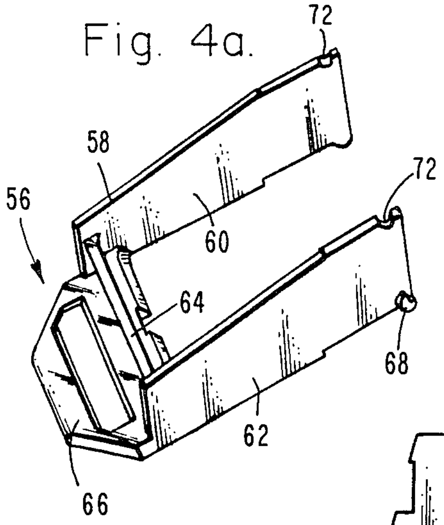
FIG. 4*a* is a perspective view of the latching yoke, which is used to lock a cartridge into position in the carriage.
Figure 4:
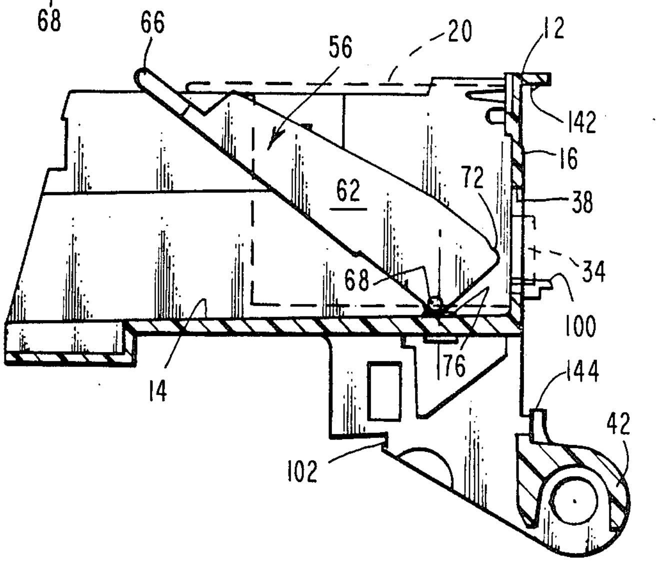
FIG. 4 is a side elevational view in partial cross-section taken along the line 4—4 of FIG. 3 to show the pivotal operation of the latching yoke.

A latch mechanism 56 (FIGS. 4 and 4*a*) securely locks the printhead cartridge 20 in position in the station 18. The latch mechanism 56 comprises a U-shaped yoke portion 58, which is adapted to encompass the sides 30, 32 and back 24 of the cartridge 20. The yoke portion has two sides 60, 62, conjoined by a rear portion 64, which is provided with a projection 66 for engagement by one or more fingers of the user.

The yoke 58 is provided with two latch pivots 68 (only one of which is visible in FIG. 4*a*), located on the lower outside ends on the sides 60, 62. The latch pivots 68 comprise lands, which engage in corresponding openings 70 (seen in FIG. 3) in the housing 12 to permit rotation of the yoke 58 about the pivots.

The yoke 58 is also provided with two indentations 72, located on the upper ends of the sides 60, 62. The indentations 72 engage corresponding sculptured surfaces 74 on the sides 30, 32 of the cartridge 20.

The lower ends of the sides 60, 62 of the yoke 58 contact a latch spring 76 in the bottom of the housing 12. The latch spring 76 advantageously comprises a leaf spring.

In operation, a cartridge 20 is inserted into a station 18, the yoke 58 being in the open, or down, position. To lock the cartridge 20 in position, the rear portion 64 of the yoke 58 is raised up by grasping the finger-engageable portion 66 thereof, causing the lower ends of the sides 60, 62 to be urged against the latch spring 76 and the indentations 72 to associatively engage the lands 74 on the cartridge. The action causes the cartridge 20 to be securely locked in place.

The latch configuration disclosed herein allows an ink cartridge 20 to be repeatably positioned against alignment features (discussed below) located in the carriage housing 12. By means of the latch, the cartridge 20 is pulled into position and locked into place. The latch contacts the cartridge 20 only along the two sculptured surfaces 74 in such a way that loading is provided on all three coordinate axes.

The latching mechanism 56 of the invention not only locks the ink cartridge 20 into place, it also moves the cartridge into its final position prior to locking. This allows the operator to merely insert the cartridge without regard to its orientation. Further, the configuration gives the printhead placement a repeatability of $\pm 12$ $\mu$m, which allows higher printer resolution than previously attainable in the prior art.

Finally, due to the use of the two sculptured surfaces 74 on the ink cartridge 20, loading is provided in all three coordinate axes solely by the latch 56. No other loading elements, such as springs or locks, are required to hold the printhead 34 in place.

Figure 5:
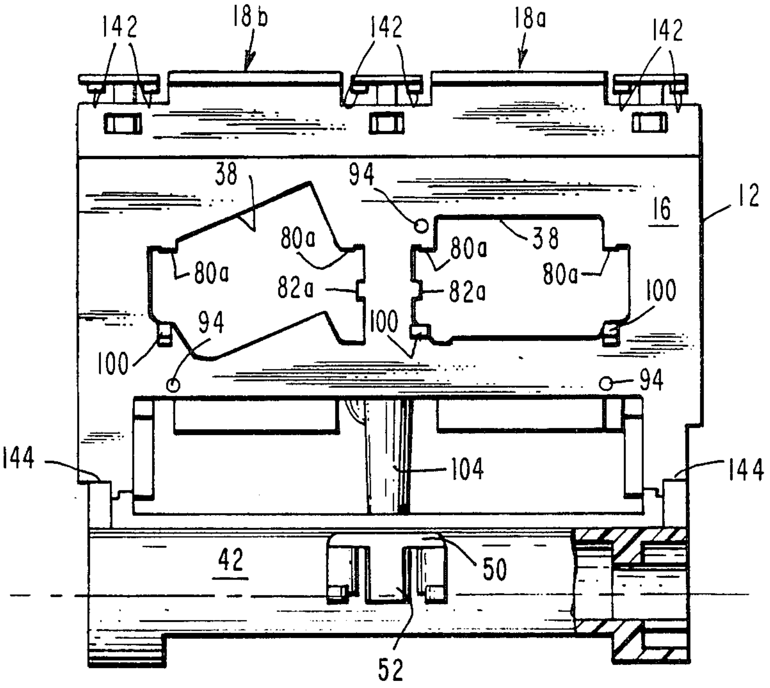
FIG. 5 is a front elevational view of the carriage, showing the face plate base thereof, prior to addition of other components on the face plate.
Figure 6:
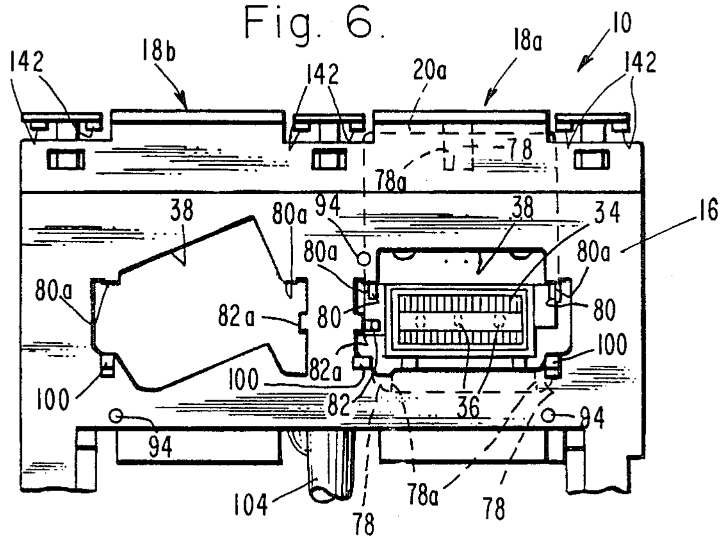
FIG. 6 is a front elevational view of the carriage, with one cartridge shown locked into position to depict the printhead mechanism and reference lands on the cartridge.
Figure 15:
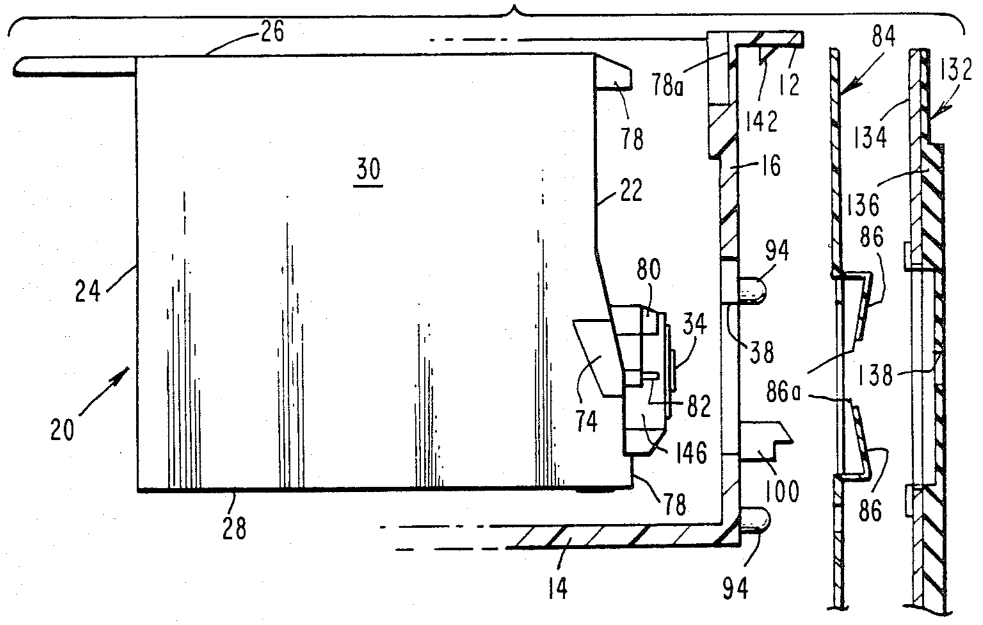
FIG. 15 is an exploded side elevational view, partially in cross-section, of the cartridge, carriage frame, lead frame and dust barrier.
Figure 12:
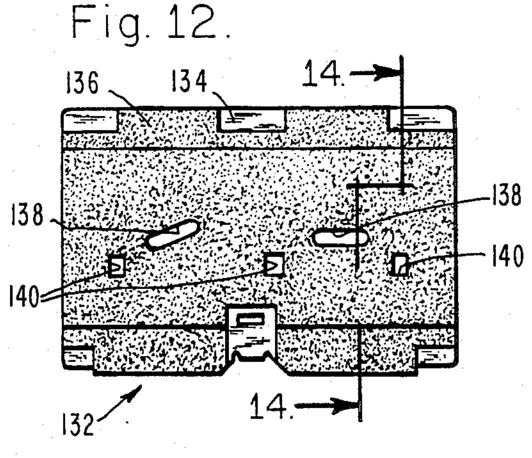
FIG. 12 is a front elevational view of dust barrier used in conjunction with the face plate portion of the cartridge.
Figure 13:
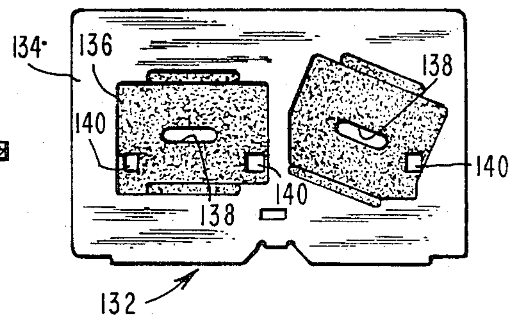
FIG. 13 is a rear elevational view of the dust barrier depicted in FIG. 12, showing a metal support frame.
Figure 14:
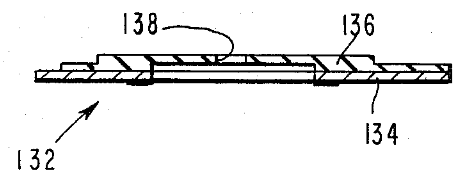
FIG. 14 is a cross-sectional view taken along the line 14—14 of FIG. 12.

To ensure that the cartridge 20 is locked in a given, fixed and repeatable position, alignment features, or registration means, (visible in FIGS. 5 and 6) are provided on the front 22 of the cartridge and on the inside of the face plate 16. While the registration means may comprise a number of suitable schemes, it is desired to prevent the cartridge from moving in any of the X-, Y-, and Z-planes. The movements to be prevented are pitch, yaw, and roll. Preferably, such movements are prevented by providing three sets of lands on the front 22 of the cartridge 20, with corresponding openings or surfaces on the inside of the face plate 16 for accepting such lands.

The first set 78 of lands limits movement of the cartridge 20 in the plane of the front surface 22 (pitch), and preferably comprises a triangular set of lands, most preferably arranged in an isosceles triangle, with one land at the top center of the front of the cartridge and two lands at the lower corners thereof. Openings 78a in the inside of the face plate 16 accept the lands.

The second set of lands 80 limits movement of the cartridge 20 along a line (yaw) and preferably comprises a set of lands provided on either side of the printhead mechanism 34 to define a line. Horizontal surfaces 80a in the opening 38 of the face plate 16 are adapted to provide a stop against which the lands rest.

The third set of lands 82 limits movement of the cartridge 20 about a point (roll) and preferably comprises a single land on one side of the printhead mechanism 34. A vertical surface 82a in the opening 38 of the face plate 16 is adapted to provide a stop against which the land rests.

It will be appreciated that the latch 56 holds the printhead 34 against the alignment features 78, 80, 82 despite dynamic loading to the carriage housing 12. Thus, the resolution of the printer is retained even in the most severe of printer environments.

An interconnect means 84 (FIGS. 7–9) is provided on the face plate 16 for electrically contacting the printhead assembly 34. This permits control by the microprocessor of the propulsion of droplets of ink from the cartridge 20 toward the medium in a predetermined pattern to form the images discussed above.

The interconnect means 84 includes a set of mutually-opposed connectors 86, also called a lead frame. Each connector set comprises a plurality of fingers 86a arranged about the opening 38 in the face plate 16. The fingers 86a are adapted to electrically and physically contact corresponding finger regions 88 on the printhead assembly 34.

The lead frame 86 is physically and electrically connected to a printed circuit board 90, provided with appropriate circuitry (not shown) to interface between the microprocessor and the printhead mechanism 34. A connector 92 (shown in FIG. 3) permits interconnection between the circuit board 90 and the microprocessor.

The lead frame 86 is registered on the face plate 16 by means of three lands 94 on the exterior surface of the face plate and by corresponding openings 96 in the lead frame. The lead frame 86 also includes provision for accommodating lands 100 on the surface of the face plate 16 used in conjunction with spacer means, discussed below.

The circuit board 90 is fixed in the front thereof in a slot 102 in the housing 12 (seen in FIG. 4) and in the rear by a stand-off 104 adapted to receive a fastening means (not shown), such as a screw, through the circuit board.

Figure 2:
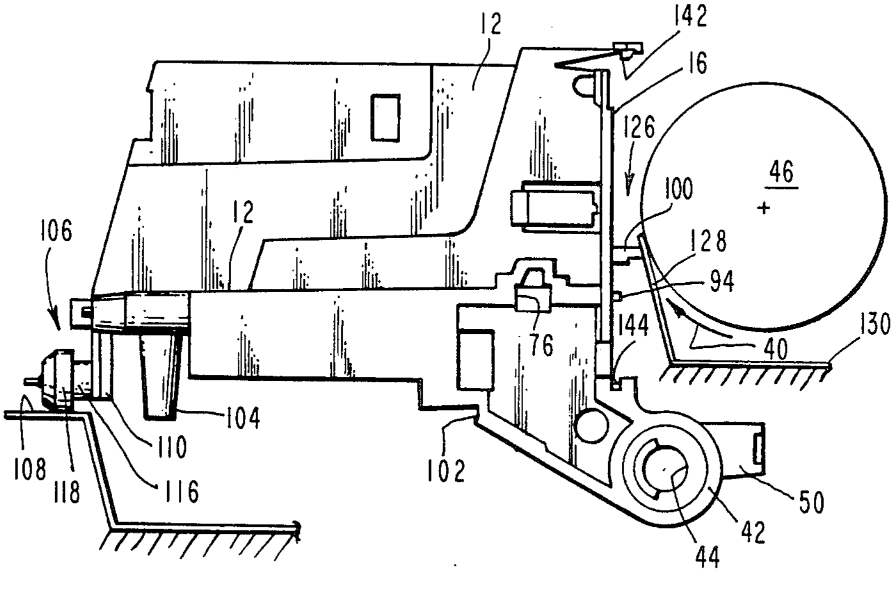
FIG. 2 is a side elevational view, showing the carriage in relation to a shim and other components of a printer, including a platen and a base portion.

A preloader assembly 106, shown in FIGS. 2 and 9, prevents the carriage housing 12 from pivoting downward about the slider rod 44, which would act to move the cartridge 20 out of its aligned position for printing. The preloader assembly 106 also serves to urge the printhead 34 in close proximity to the medium on the platen 46, as described in greater detail below.

The preloader assembly 106 comprises a spring-loaded mechanism, adapted to roll on a guide surface 108. The spring-loaded mechanism includes a spring-loaded arm 110, downwardly urged by a spring 112 against the guide surface 108, which is advantageously a portion of the base of the printer.

The arm 110, which pivots about an axis 114, is provided with an extension 116 having a freely rotating roller 118 mounted thereon in physical contact with the guide surface 108. An upwardly extending tab stop 120 on a portion of the arm 110 passes through an opening in the base 14 of the carriage housing 12 to keep the spring 112 in place on stubs 122, 124 of the bottom of the base and on the arm, respectively.

The preloader assembly 106, comprising just three separate parts (the spring 112, the roller 118 and the arm 110), is easily assembled in snap-fit relationship.

Finally, spacer means 126 is employed to keep the printhead mechanism 34 a fixed, minimum distance from the medium. This is accomplished by providing a shim 128, supported by a shim support 130, and at least one land 100, preferably three, situated on the exterior of the face plate 16, on a line just below the opening 38. The spring loader assembly 106 acts to urge the carriage housing 12 against the shim 128, and the land 100 provides the fixed distance separation between the shim and the printhead mechanism 34.

The shim 128 includes a low friction surface, preferably one comprising a plastic, metal, or plastic-coated metal. For providing a ground to the medium, a metal shim is desirably employed.

In operation, the printhead 34 (actually, the lands 100) rides on the shim 128, which holds the print medium (shown by arrow 40) against the platen 46. This arrangement serves to minimize the printhead-to-medium distance variation to thereby improve print quality and reduce paper waviness.

Two stations 18 are preferably employed in the assembly 10 of the invention. One station, denoted 18a, is shown with the opening 38 oriented horizontally, and accepts a cartridge 20a with a horizontally-oriented printhead mechanism 34. Such a cartridge 20a includes three interior compartments, each containing a different color ink, e.g., magenta, cyan and yellow.

The other station, denoted 18b, is shown with the opening 38 oriented at an angle, and accepts a cartridge 20b with a correspondingly-oriented printhead mechanism 34. Such a cartridge 20b contains black ink.

Orienting the printhead mechanism 34 on the black ink cartridge 20b in this fashion permits printing all three primitives 36 at the same time, to provide three rows of printing, thereby reducing the time required to finish one page of printing. The middle primitive 36 is registered with the colored ink primitives, while the upper and lower primitives are registered to print rows above and below the middle print row, respectively.

The lead frame 86 is protected from dust and other debris by a dust barrier 132 which is mounted on the exterior of the face plate 16. The dust barrier 132 comprises a rigid support 134, such as of a metal, and a resilient overlay 136, such as of a rubber. The resilient overlay 136 of the dust barrier 132 is provided with an opening 138 which corresponds with the opening 38 in the face plate 16, but is considerably smaller, of a size sufficient to permit ejection of droplets of ink therethrough. Of course, where two stations 18 are provided, two corresponding openings 138 are also provided.

The dust barrier 132 is provided with openings 140 corresponding to the lands 100 and is held in place on the exterior of the face plate 16 by top and bottom tabs 142, 144, respectively, which engage the dust barrier in snap-fit arrangement.

In practice, the act of locking the cartridge 20 in place, as described above, seals the printhead mechanism 34 against the resilient overlay 136. Such sealing is ensured by forming the printhead mechanism 34 on a suitably-sized stand-off 146 on the front 22 of the cartridge 20 such that upon locking the cartridge 20 in place, the resilient overlay 136 deforms slightly.

INDUSTRIAL APPLICABILITY

The combination printhead cartridge and carriage assembly 10 of the invention is suitably employed in ink-jet printers, particularly in thermal ink-jet printers.

Thus, there has been disclosed a combination printhead cartridge and carriage assembly that provides secure registration and locking of the cartridge, fixed spacing from the medium being printed on, and dust protection of the interconnect means used to physically and electrically connect the printhead mechanism on the cartridge with the microprocessor controlling the pattern of printing of images. It will be obvious to one skilled in this art that various modifications and changes may be made without departing from the spirit and scope of this invention, and all such modifications and changes are intended to fall within the scope of this invention, as defined by the appended claims.

What is claimed is:

1. A printhead cartridge and carriage assembly (10) for use with ink-jet printers comprising:

(a) a carriage housing (12) provided with a base (14) and a face plate (16), and at least one station (18) for cooperatively accepting a cartridge (20), one side (22) of which is provided with a printhead assembly (34), said face plate provided with an opening (38) associated with said at least one station for permitting droplets of ink ejected from said cartridge to pass therethrough, said housing provided (i) with means (42) for encompassing a slider rod (44) associated with a platen (46) of said printer and (ii) with means (52) for attaching a portion of a belt (48) also associated with said printer, so as to permit bidirectional movement along said slider rod in response to directed movement of said belt, thereby positioning said housing and said at least one cartridge for printing on a medium (40) supported on said platen;

(b) a latch mechanism (56) to securely lock said printhead cartridge in position in said at least one station;

(c) means (78, **78*a*, 80, 80*a*, 82, 82*a***) on both said printhead side of said cartridge and the inside of said face plate for registering said cartridge in a given, fixed, repeatable position;

(d) interconnect means (84) on said face plate for electrically contacting said printhead assembly to permit control of the propulsion of droplets of ink from said cartridge toward said medium in a predetermined pattern to form images thereon;

(e) spacing means (126) for permitting said printhead assembly to be spaced a minimum distance from said medium; and (f) a preloader assembly (106) for preventing drop of said carriage housing from pivoting about said slider rod and for maintaining said printhead assembly at said minimum distance.

2. The assembly of claim 1 wherein two such stations (**18*a*, 18*b***) are provided, arranged side by side.

3. The assembly of claim 2 wherein one of said stations (**18*a*) is adapted to receive a cartridge (20*a*) containing a plurality of colored inks and another of said stations (18*b*) is adapted to receive a cartridge (20*b***) containing black ink.

4. The assembly of claim 3 wherein said black ink cartridge (**20*b*) is registered to print said pattern coincident with that provided by said cartridge (20*a***) containing said colored ink.

5. The assembly of claim 2 wherein said printhead assemblies (34) are rectangular in configuration, with said printhead assembly of said colored ink cartridge (**20*a*) being aligned on said cartridge in a predetermined orientation and said opening (38) in said face plate (16) correspondingly aligned, and with said printhead assembly of said black ink cartridge (20*b***) being aligned in a predetermined orientation rotated a given amount about an axis perpendicular to the plane in which said printhead assembly resides and said opening in said face plate correspondingly aligned.

6. The assembly of claim 1 wherein said cartridge (20) comprises a housing having a front (22), back (24), top (26), bottom (28) and two sides (30, 32), with said printhead assembly (34) mounted in said front and wherein said latch mechanism (56) comprises a U-shaped yoke (58) defined by two flat side portions (60, 62) joined by a finger-engageable portion (66) for encompassing the sides and back of said cartridge, said yoke (a) having two latch pivots (68) at the lower outside ends thereof comprising a land for engaging in a corresponding opening (70) in said housing (12) to permit rotation of said yoke thereabout and (b) having on each corner of the upper ends thereof an indentation (72) for engaging a corresponding sculptured surface (74) on the side of said cartridge housing for locking said cartridge in position, said locking aided by a latch spring (76) against which said bottom corner portion is urged.

7. The assembly of claim 1 wherein said surface (22) of said cartridge (20) containing said printhead assembly (34) is provided with three sets of lands (78, 80, 82) for accurately registering said cartridge, a first set (78) for limiting movement of said cartridge in the plane of said surface, a second set (80) for limiting movement of said cartridge along a line perpendicular to said surface, and a third set (82) for limiting movement of said cartridge about a point, said inside of said face plate (16) being adapted to receive said lands.

8. The assembly of claim 7 wherein said first set of lands (78) comprises a triangular set of lands.

9. The assembly of claim 8 wherein said first set of lands (78) defines an isosceles triangle.

10. The assembly of claim 7 wherein said second set of lands (80) comprises a pair of lands, disposed on either side of said printhead assembly (34).

11. The assembly of claim 7 wherein said third set of lands (82) comprises a single land.

12. The assembly of claim 11 wherein said land (82) is disposed on one side of said printhead assembly (34).

13. The assembly of claim 1 wherein said carriage housing (12) is provided with a hollow cylindrical portion (42), mounted below said face plate (16) and oriented parallel thereto, for encompassing said slider rod (44).

14. The assembly of claim 13 wherein said belt (48) is provided with teeth (**48*a*) on one side thereof and the exterior of said cylindrical portion (42) is provided with a housing (50) having a U-shaped interior cut-out (52) for accepting said belt, a portion of said interior cut-out provided with teeth (54**) for engaging a portion of said teeth on said belt in locking relationship.

15. The assembly of claim 1 wherein an electronic assembly (90) for controlling said pattern of ink droplets from said printhead assembly (34) via said electrical contacting means (84) is mounted beneath said base (14) of said housing (12) and is provided with means for connection (92) to a microprocessor in said ink-jet printer for said control.

16. The assembly of claim 1 wherein said preloader assembly (106) includes spring-loaded means (110) for urging said face place portion (16) of said housing (12) against said spacing means (128) associated with said ink-jet printer.

17. The assembly of claim 16 wherein said face plate (16) is provided with at least one land (100) maintaining said face plate a fixed distance from said spacing means (128).

18. The assembly of claim 17 wherein said spacing means (126) includes a low friction surface (128) against which said land (100) is urged by said spring-loaded means (110).

19. The assembly of claim 18 wherein said spacing means (128) comprises a material selected from the group consisting of plastics, metals, and plastic-coated metals.

20. The assembly of claim 15 wherein said spring-loaded means (110) is adapted to roll on a guide surface (108) to thereby prevent said drop of said housing (12).

21. The assembly of claim 20 comprising a spring-loaded arm (110), downwardly urged by said spring (112) against said guide surface (108), said arm provided with an extension (116) having a freely rotating roller (118) mounted thereon in physical contact with said guide surface.

22. The assembly of claim 1 wherein said interconnect means (84) comprises two sets of mutually-opposed connectors (86), each set comprising a plurality of fingers (86*a*), arranged about said opening (38) in said face plate (16) and adapted to electrically and physically contact corresponding finger regions (88) on said printhead assembly (34).

23. The assembly of claim 1 further provided with means (132) for protecting said interconnect means (84).

24. The assembly of claim 23 wherein said protection means (132) comprises a dust barrier mounted on said face plate (16) and provided with openings (138) corresponding to said openings (38) in said face plate (16) to permit droplets of ink to be ejected therethrough.

25. The assembly of claim 24 wherein said dust barrier (132) comprises a substantially rigid frame (134) supporting a resilient material (136), against which said printhead assembly (34) of said cartridge (20) is urged upon locking by said latch mechanism (56).

26. A printhead cartridge and carriage assembly (10) for use with ink-jet printers comprising:

(a) a carriage housing (12) provided with a base (14) and a face plate (16), and two stations (18*a*, 18*b*), arranged side by side, for cooperatively accepting a cartridge (20), with one of said stations (18*a*) adapted to receive a cartridge (20*a*) containing a plurality of colored inks and another of said stations (18*b*) adapted to receive a cartridge (20*b*) containing black ink, and with said cartridge comprising a housing having a front (22), back (24), top (26), bottom (28) and two sides (30, 32), said front thereof provided with a printhead assembly (34), said face plate provided with openings (38) associated with said stations for permitting droplets of ink ejected from said cartridge to pass therethrough, said housing provided (1) with means (42) for encompassing a slider rod (44) associated with a platen (46) of said printer and (2) with means (52) for attaching a portion of a belt (48) also associated with said printer, so as to permit bidirectional movement along said slider rod in response to directed movement of said belt, thereby positioning said housing and said cartridges for printing on a medium (40) supported on said platen;

(b) a latch mechanism (56) to securely lock said printhead cartridge in position in said stations, said latch mechanism comprising a U-shaped yoke (58) defined by two flat side portions (60, 62) joined by a finger-engageable portion (66) for encompassing the sides and back of said cartridge, said yoke (1) having two latch pivots (68) at the lower outside ends thereof comprising a land for engaging in a corresponding opening (70) in said housing to permit rotation of said yoke thereabout and (2) having on each corner of the upper ends thereof an indentation (72) for engaging a corresponding sculptured surface (74) on the side of said cartridge housing for locking said cartridge in position, said locking aided by a latch spring (76) against which said bottom corner portion is urged;

(c) means (78, 78*a*, 80, 80*a*, 82, 82*a*) on both said printhead side of said cartridge and the inside of said face plate for registering said cartridge in a given, fixed, repeatable position, with said surface of said cartridge containing said printhead assembly provided with three sets of lands (78, 80, 82) for accurately registering said cartridge, a first set (78) for limiting movement of said cartridge in the plane of said surface, a second set (80) for limiting movement of said cartridge along a line perpendicular to said surface, and a third set (82) for limiting movement of said cartridge about a point, said inside of said face plate being adapted to receive said lands;

(d) interconnect means (84) on said face plate for electrically contacting said printhead assembly to permit control of the propulsion of droplets of ink from said cartridge toward said medium in a predetermined pattern to form images thereon, said interconnect means comprising two sets of mutually-opposed connectors (86), each set comprising a plurality of fingers (86*a*), arranged about said opening in said face plate and adapted to electrically and physically contact corresponding finger regions (88) on said printhead assembly;

(e) spacing means (126) for permitting said printhead assembly to be spaced a minimum distance from said medium, said face plate provided with at least one land (100) maintaining said face plate a fixed distance from said spacing means, said spacing means comprising a shim (128) holding said medium against said platen;

(f) a preloader assembly (106) for preventing drop of said carriage housing from pivoting about said slider rod and for maintaining said printhead assembly at said minimum distance, said preloader assembly including spring-loaded means (110) for urging said face place portion of said housing against said spacing means associated with said ink-jet printer and adapted to roll on a guide surface (108) to thereby prevent said drop of said housing; and (g) means (132) for protecting said interconnect means, comprising a dust barrier mounted on said face plate and provided with openings (138) corresponding to said openings in said face plate to permit droplets of ink to be ejected therethrough.

27. The assembly of claim 26 wherein said black ink cartridge (20*b*) is registered to print said pattern coincident with that provided by said cartridge (20*a*) containing said colored ink.

28. The assembly of claim 26 wherein said printhead assemblies (34) are rectangular in configuration, with said printhead assembly of said colored ink cartridge (20*a*) being aligned on said cartridge in a predetermined orientation and said opening (38) in said face plate (16) correspondingly aligned, and with said printhead assembly of said black ink cartridge (20*b*) being aligned in a predetermined orientation rotated a given amount about an axis prependicular to the plane in which said printhead assembly resides and said opening in said face plate correspondingly aligned.

29. The assembly of claim 26 wherein said first set of lands (78) comprises a triangular set of lands, defining an isoceles triangle.

30. The assembly of claim 26 wherein said second set of lands (80) comprises a pair of lands, disposed on either side of said printhead assembly.

31. The assembly of claim 26 wherein said third set of lands (82) comprises a single land, disposed on one side of said printhead assembly.

32. The assembly of claim 26 wherein said carriage housing (12) is provided with a hollow cylindrical portion, (42) mounted below said face plate (16) and oriented parallel thereto, for encompassing said slider rod (44).

33. The assembly of claim 32 wherein said belt (48) is provided with teeth (48*a*) on one side thereof and the exterior of said cylindrical portion (42) is provided with a housing (50) having a U-shaped interior cut-out (52) for accepting said belt, a portion of said interior cut-out provided with teeth (54) for engaging a portion of said teeth on said belt in locking relationship.

34. The assembly of claim 26 wherein an electronic assembly (90) for controlling said pattern of ink droplets from said printhead assembly (34) via said electrical contacting means (84) is mounted beneath said base (14) of said housing (12) and is provided with means (92) for connection to a microprocessor in said ink-jet printer for said control.

35. The assembly of claim 26 wherein said spacing means (128) includes a low friction surface.

36. The assembly of claim 35 wherein said spacing means (128) comprises a material selected from the group consisting of plastics, metals, and plastic-coated metals.

37. The assembly of claim 26 comprising a spring-loaded arm (110), downwardly urged by said spring (112) against said guide surface (108), said arm provided with an extension (116) having a freely rotating roller (118) mounted thereon in physical contact with said guide surface.

38. The assembly of claim 26 wherein said dust barrier (132) comprises a substantially rigid frame (134) supporting a resilient material (136), against which said printhead assembly (34) of said cartridge (20) is urged upon locking by said latch mechanism (56).

39. A latch mechanism (56) for securely locking an ink-jet printhead cartridge (20) in position in a carriage (12) associated with an ink-jet printer, said cartridge comprising a housing having a front (22), back (24), top (26), bottom (28) and two sides (30, 32), with said printhead assembly mounted on said front thereof, said latch mechanism comprising a U-shaped yoke (58) defined by two flat side portions (60, 62) joined by a finger latching portion (66) for encompassing the sides and back of said cartridge, said yoke (i) having two latch pivots (68) at the lower outside ends thereof comprising a land for engaging in a corresponding opening (70) in said carriage to permit rotation of said yoke thereabout and (ii) having on each corner of the upper ends thereof an indentation (72) for engaging a corresponding sculptured surface (74) on the side of said cartridge housing for locking said cartridge in position, said locking aided by a latch spring (76) against which said bottom corner portion is urged.

40. A registration means (78, 78*a*, 80, 80*a*, 82, 82*a*) for accurately registering an ink-jet printhead cartridge (20) in a carriage (12) associated with an ink-jet printer comprising:

(a) a cartridge supporting a printhead assembly (34) and provided with three sets of lands (78, 80, 82) for accurately registering said cartridge, a first set (78) for limiting movement of said cartridge in the plane of said surface, a second set (80) for limiting movement of said cartridge along a line perpendicular to said surface, and a third set (82) for limiting movement of said cartridge about a point; and (b) means (78*a*, 80*a*, 82*a*) in said carriage adapted to receive said lands.

41. The registration means of claim 40 wherein said carriage (12) is provided with a face plate (16), having at least one opening (38) therethrough to accommodate said printhead assembly (34) of at least one cartridge (20), the interior of said face plate and said at least one opening provided with a combination of openings (78*a*) and surfaces (80*a*, 82*a*) to receive said lands.

42. The registration means of claim 41 wherein said first set of lands (78) comprises a triangular set of lands.

43. The registration means of claim 42 wherein said first set of lands (78) defines an isoceles triangle.

44. The registration means of claim 41 wherein said second set of lands (80) comprises a pair of lands, disposed on either side of said printhead assembly (34).

45. The registration means of claim 41 wherein said third set of lands (82) comprises a single land.

46. The registration means of claim 45 wherein said land (82) is disposed on one side of said printhead assembly (34).

47. Apparatus for preventing drop of a carriage housing, adapted to move bidirectionally on a slider rod associated with a printer, and for maintaining a printhead assembly of an ink-jet carriage locked in said carriage housing at a predetermined minimum distance from a medium upon which printing of images is done, said apparatus including:

(a) a shim for holding said medium against a printing platen; and (b) spring-loaded means for urging said housing against said shim, said spring-loaded means adapted to roll on a guide surface to thereby prevent said drop of said housing.

48. The apparatus of claim 47 wherein said housing (12) includes a face plate (16) which is provided with at least one land (100) maintaining said face plate a fixed distance from said shim (128).

49. The apparatus of claim 48 wherein said shim (128) includes a low friction surface against which said land (100) is urged by said spring-loaded means (110).

50. The apparatus of claim 49 wherein said shim (128) comprises a material selected from the group consisting of plastics, metals, and plastic-coated metals.

51. The apparatus of claim 47 comprising a spring-loaded arm (110), downwardly urged by said spring (112) against said guide surface (108), said arm provided with an extension (116) having a freely rotating roller (118) mounted thereon in physical contact with said guide surface.

52. A device (132) for protecting interconnect means (86) associated with an ink-jet cartridge (20) in an ink-jet printer, said cartridge provided with a printhead assembly (34) to which said interconnect means are electrically and physically connected, said cartridge locked in a face plate (16) of a carriage housing (12) in which said interconnect means are provided, said face plate provided with an opening (38) associated with said printhead assembly to permit ejection of droplets of ink therethrough, with said interconnect means associated with said opening to contact said printhead assembly, said device comprising a dust barrier mounted on said housing and provided with an opening (138) corresponding with said face plate opening, said dust barrier adapted to seal around said nozzle plate to continually isolate said interconnect means from paper dust and the like when said cartridge is locked in said face plate.

53. The device of claim 52 wherein said interconnect means (84) comprises two sets of mutually-opposed connectors (86), each set comprising a plurality of fingers (**86*a*), arranged about said opening (38) in said face plate (16) and adapted to electrically and physically contact corresponding finger regions (88) on said printhead assembly (34**).

54. The device of claim 52 wherein said dust barrier (132) comprises a substantially rigid frame (134) supporting a resilient overlay (136) provided with an opening (138) associated with said opening (38) in said face plate (16), said resilient overlay adapted to conform to said printhead assembly (34) so as to seal said interconnect means (84) against said printhead assembly.

* * * * *